Figure 3:
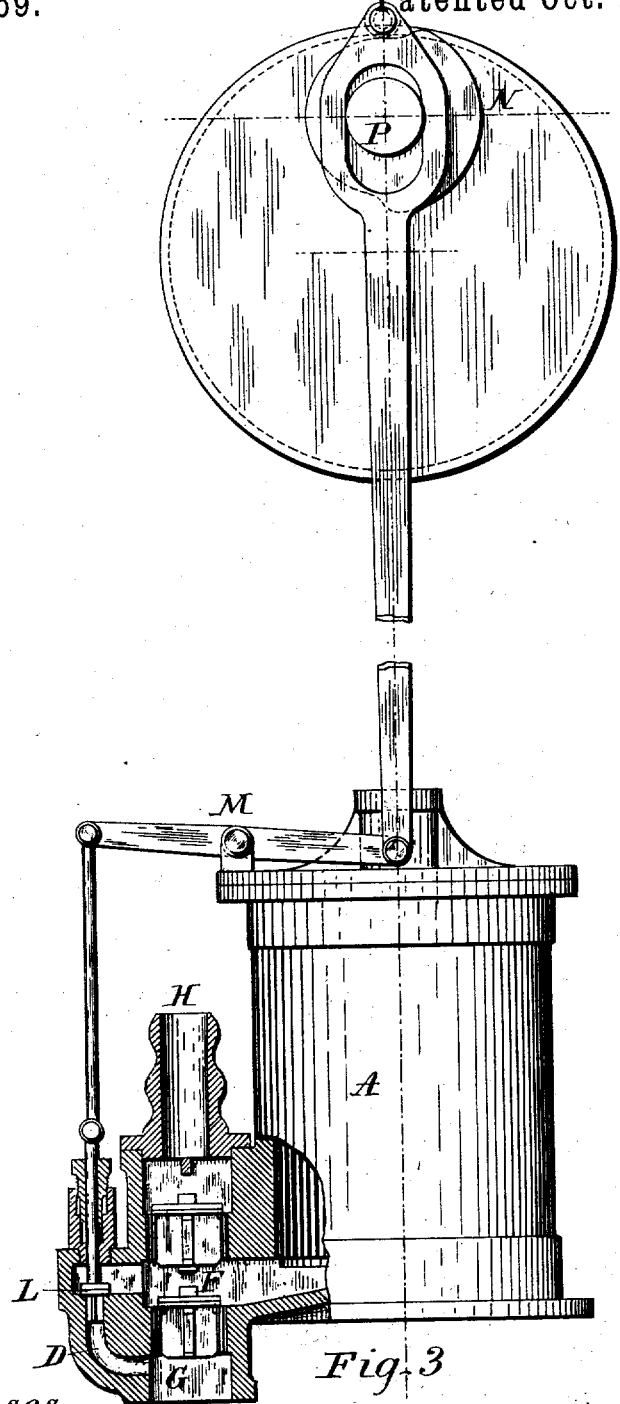

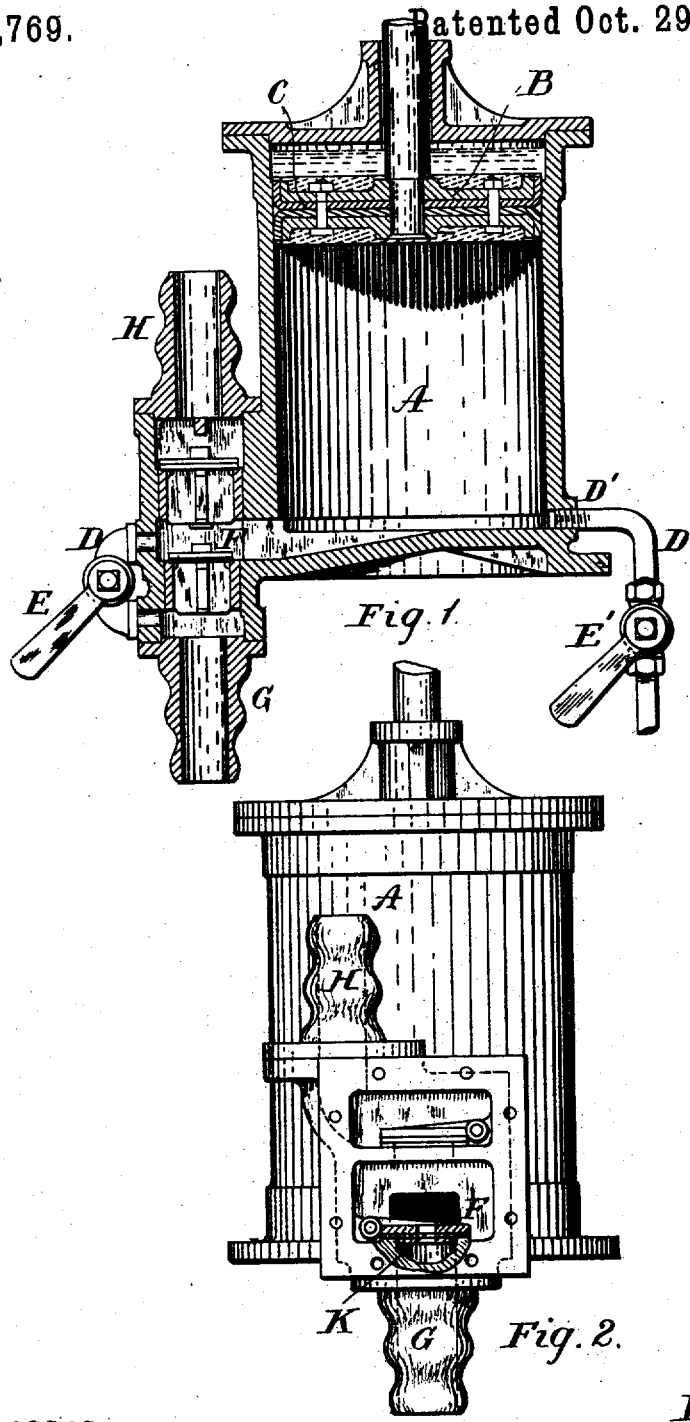

(No Model.) 3 Sheets—Sheet 2.

C. T. J. VAUTIN.
APPARATUS FOR SEPARATING SOLUTIONS OF METALLIC SALTS FROM PULVERIZED MATERIAL MIXED THEREWITH.

No. 413,769. Patented Oct. 29, 1889.

Witnesses
Lloyd B. Wight
David A. Fourick

Inventor
CLAUDE THEODORE JAMES VAUTIN,
By his Attorney (No Model.) 3 Sheets—Sheet 3.

C. T. J. VAUTIN.
APPARATUS FOR SEPARATING SOLUTIONS OF METALLIC SALTS FROM PULVERIZED MATERIAL MIXED THEREWITH.

No. 413,769. Patented Oct. 29, 1889.

Witnesses
H. H. Lamb
Alex Scott

Inventor
CLAUDE THEODORE JAMES VAUTIN
By his Attorney

N. PETERS, Photo-Lithographer, Washington, D. C.

UNITED STATES PATENT OFFICE.

CLAUDE THEODORE JAMES VAUTIN, OF LONDON, ENGLAND.

APPARATUS FOR SEPARATING SOLUTIONS OF METALLIC SALTS FROM PULVERIZED MATERIAL MIXED THEREWITH.

SPECIFICATION forming part of Letters Patent No. 413,769, dated October 29, 1889.

Application filed November 30, 1887. Serial No. 256,579. (No model.)

*To all whom it may concern:*

Be it known that I, CLAUDE THEODORE JAMES VAUTIN, a subject of Her Majesty the Queen of Great Britain and Ireland, residing at London, England, have invented an Improved Apparatus for the Separation of Solutions of Metallic Salts from Pulverized Material Mixed Therewith, of which the following is a specification.

My invention relates to improvements in apparatus to be employed for the separation of solutions of metallic salts—such as those of gold—from powdered ore or like material mixed therewith.

My invention consists in the combination, with a filter of suitable material and construction, of a suction and force pump having a contracted reflux-passage and peculiar connections, as hereinafter described, the pump upon its return-stroke forcing a portion of the liquid which it has drawn by suction back through the filtering medium in the reverse direction to its former draft. While such portion of the liquid charge of the pump is being forced back through the filtering medium the remainder is delivered through a suitable valve or valves in the common method of an ordinary suction and force pump. The great advantages I obtain by this special combination are, first, the more rapid passage of the liquid solution through the filtering medium than would be the case were the solution to filter merely by gravity; and, second, the freeing, cleaning, or loosening of the filtering medium and of the pulverized material by the reflux of a portion of the pump-charge back through the filtering medium, which would otherwise become choked, and thus greatly impede the penetration of the solution.

The pump and filter may with advantage be constructed so as to fulfill the above objects in the following manner, though, as is obvious, equivalent parts may in cases be substituted for those described; and in order that my invention may be the better understood, I now proceed to describe the same in relation to the drawings hereunto annexed, reference being had to the letters and figures marked thereon.

Like letters refer to like parts throughout the drawings.

Figure 4:
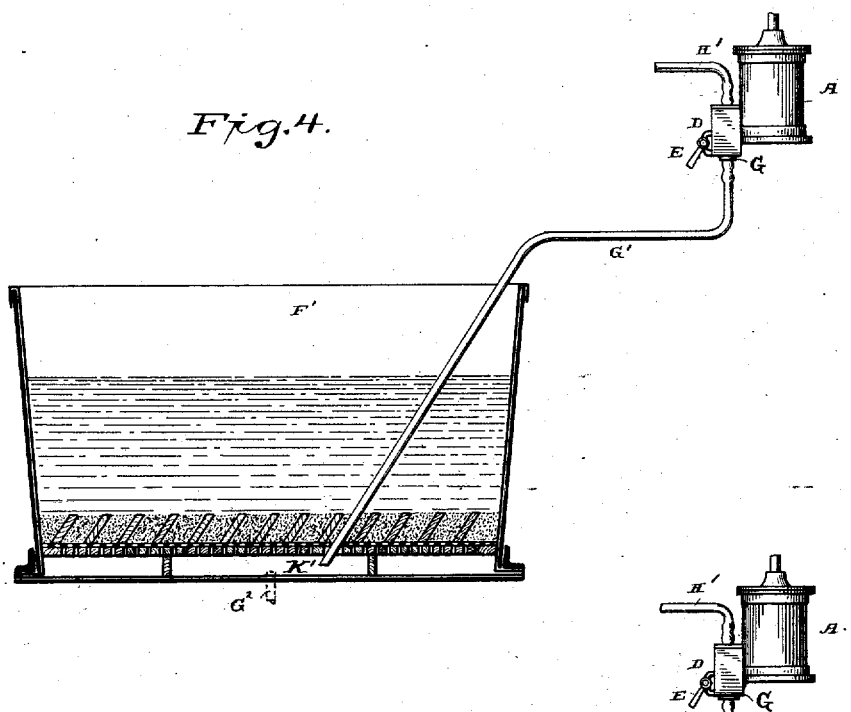
Figure 5:
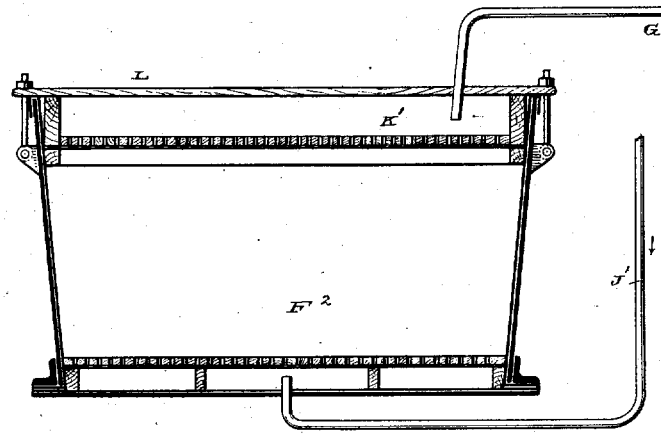

Figure 1 is a vertical section through the pump and valve-box, illustrating one suitable method of carrying my invention into effect. Fig. 2 is a section through the valve-box of a second modified but equivalent form. Fig. 3 is a vertical section through the valve-box, with an elevation of the operating mechanism or attached gear of a third modified but equivalent form. Figs. 4 and 5 are sectional elevations of suitable filters, with elevations of the pump shown in Fig. 1 and suitable connections, completing my combination of apparatus in different but equivalent ways.

The pump-barrel A is constructed in any convenient manner corresponding to that of an ordinary suction-pump. I find it convenient in processes where solutions of chloride or bromide salts are treated that the said pump-barrel and metallic parts in contact with the solution shall be made from an alloy of lead and antimony, and that the pump-piston B shall be packed with cup-leathers C, Fig. 1.

The essential feature of the pump consists in the construction either of the valves, valve-box connections, or connections between the pump and the filter, with a contracted reflux-passage D or D' or K, so that upon the return discharge-stroke of the piston a reflux of the drawn charge of liquid may be sent back through the filtering medium. In Figs. 1, 4, and 5 this is effected by making a branch communication D, fitted with a cock E for regulation, between the upper side of the suction-valve F and the lower side or suction-pipe. If this branch passage is left partially open, the piston on its suction-stroke draws the liquid both through the suction-valve F and through this branch passage D, which is of small relative area, either to the suction or delivery pipes. Upon the return-stroke of the piston B a portion of the charge will return by the by-pass D through the suction-pipe G back to the filtering medium of the filter F' or F², and there raise and loosen or cleanse the said filtering medium, the remainder of the charge passing through the delivery-pipe H in the ordinary way. This effect may be equivalently produced by placing the by-pass in the form of a pipe at D', Fig. 1, that is in communication with the bottom of the pump-barrel A. This pipe should also be fitted with a hand cock or plug E', and may be carried into any convenient portion of the suction-pipe or direct into the filtering-vessel. Equivalently, as in Fig. 2, the same effect may be produced by an orifice K, provided in the suction-valve F; or, equivalently, a by-pass D, Fig. 3, may be provided with an independent valve L, by which communication from the pump-barrel A direct into the suction-pipe or filtering-vessel on the return-stroke is effected when the said auxiliary valve L is raised. This valve is controlled by the lever-motion M, operated by any convenient tappet or eccentric motion, or by a cam-motion N upon the rotary shaft P, from which the pump is driven.

The filter F', Fig. 4, is adapted to filter downward while water is poured into its open top. It is consequently constructed with a suction-chamber K' at bottom, and with this chamber the inlet-neck G and the contracted reflux-passage D of the pump are connected by a pipe G', passing downward through the filtering medium into said chamber, or a pipe G² otherwise extended into the same, and the metallic solution is discharged from the pump through an outlet-pipe H'. The filter F² has its suction-chamber K' within a chambered cover L', being arranged to filter the metallic solution upward through a confined filtering medium, while water is introduced into its chambered bottom through a pipe J'. The chamber K' is connected with the suction-inlet and contracted reflux-passage of the pump by a pipe G', as before.

Both of the filters are shown and more fully described in my application for patent filed November 30, 1887, Serial No. 256,578, and as their details form no part of the present invention further description thereof herein will be omitted.

Having now particularly described and ascertained the nature of my said invention and in what manner the same is to be performed, be it known that I do not claim the suction of a liquid through a filtering medium by the operation of an ordinary suction-pump merely, nor the provision of a pump with a contracted reflux-passage or by-pass, alone considered; but What I do claim is—

In an apparatus for the separation of solutions of metallic salts from pulverized material mixed therewith, the combination of a suitable filter having a suction-chamber, a pump having a contracted reflux-passage, and a pipe or pipes connecting said chamber with said reflux-passage and with the suction-inlet of the pump, substantially as hereinbefore specified, for the purposes set forth.

In testimony whereof I have signed my name to this specification in the presence of two subscribing witnesses.

CLAUDE THEODORE JAMES VAUTIN.

Witnesses:
 WILLIAM BOHM,
 SAMUEL P. WILDING.